(12) United States Patent
Huntzinger et al.

(10) Patent No.: US 11,796,412 B2
(45) Date of Patent: Oct. 24, 2023

(54) SENSING COMPONENTS COMPRISING COUPLING ELEMENTS

(71) Applicant: Honeywell International Inc., Charlotte, NC (US)

(72) Inventors: Bradley John Huntzinger, Columbus, OH (US); Josh Mark Fribley, Columbus, OH (US); Richard Charles Sorenson, London, OH (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/447,500

(22) Filed: Sep. 13, 2021

(65) Prior Publication Data

US 2023/0081035 A1  Mar. 16, 2023

(51) Int. Cl.
*G01L 19/14* (2006.01)
*G01L 19/06* (2006.01)

(52) U.S. Cl.
CPC .................................. *G01L 19/142* (2013.01)

(58) Field of Classification Search
CPC .............. G01L 19/142; G01L 19/0654; G01L 19/0627
See application file for complete search history.

(56) References Cited

U.S. PATENT DOCUMENTS

| 7,216,545 | B2  | 5/2007 | Uchida et al. |
| 2004/0127839 | A1* | 7/2004 | Sigurjonsson ...... A61F 13/0276 |
| | | | 602/55 |

| 2018/0306660 | A1* | 10/2018 | Wade .................. A61M 5/1452 |
| 2020/0003649 | A1 | 1/2020 | Kachenko et al. |
| 2020/0031661 | A1 | 1/2020 | Miclaus et al. |
| 2020/0357715 | A1 | 11/2020 | Vincent |

FOREIGN PATENT DOCUMENTS

| DE | 102004033475 A1 | 8/2005 | |
| WO | WO-2018051158 A1 * | 3/2018 | ............. C08L 83/04 |
| WO | 2019/129388 A1 | 7/2019 | |

OTHER PUBLICATIONS

European search report dated Feb. 14, 2023 for EP Application No. 22195376.

* cited by examiner

*Primary Examiner* — Herbert K Roberts
*Assistant Examiner* — Anthony W Megna Fuentes
(74) *Attorney, Agent, or Firm* — Alston & Bird LLP

(57) ABSTRACT

Methods, apparatuses and systems for providing sensing components for apparatuses are disclosed herein. An example sensing component comprises: a substrate; a sensing element attached to a surface of the substrate and in electronic communication therewith; a lower coupling element in contact with the sensing element defining a bottom layer of the sensing component; and an upper coupling element disposed adjacent a top surface of the lower coupling element and defining a top layer of the sensing component, wherein the lower coupling element exhibits lower internal stress relative to the upper coupling element.

16 Claims, 5 Drawing Sheets

SENSING COMPONENTS COMPRISING COUPLING ELEMENTS

BACKGROUND

Apparatuses comprising sensing components (e.g., pressure sensing components) may detect and/or measure various parameters (e.g., pressure) in a wide variety of applications including, for example, commercial, automotive, aerospace, industrial, and medical applications. Many sensing components are plagued by technical challenges and limitations. Through applied effort, ingenuity, and innovation, many of these identified problems have been solved by developing solutions that are included in embodiments of the present disclosure, many examples of which are described in detail herein.

BRIEF SUMMARY

Various embodiments described herein relate to sensing components in a variety of methods, apparatuses, and systems.

In accordance with various examples of the present disclosure, a sensing component is provided. In some examples, the sensing component comprises: a substrate, a sensing element attached to a surface of the substrate and in electronic communication therewith, a lower coupling element in contact with the sensing element defining a bottom layer of the sensing component, and an upper coupling element disposed adjacent a top surface of the lower coupling element and defining a top layer of the sensing component, wherein the lower coupling element exhibits lower internal stress relative to the upper coupling element.

In accordance with various examples of the present disclosure, a method for manufacturing a sensing component is provided. In some examples, the method comprises preparing a substrate, attaching a sensing element to a surface of the substrate, attaching a columnar structure to the substrate in order to surround the sensing element and define a cavity, disposing a lower coupling element within the columnar structure, and disposing an upper coupling element within the structure, wherein the lower coupling element exhibits lower internal stress relative to the upper coupling element.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
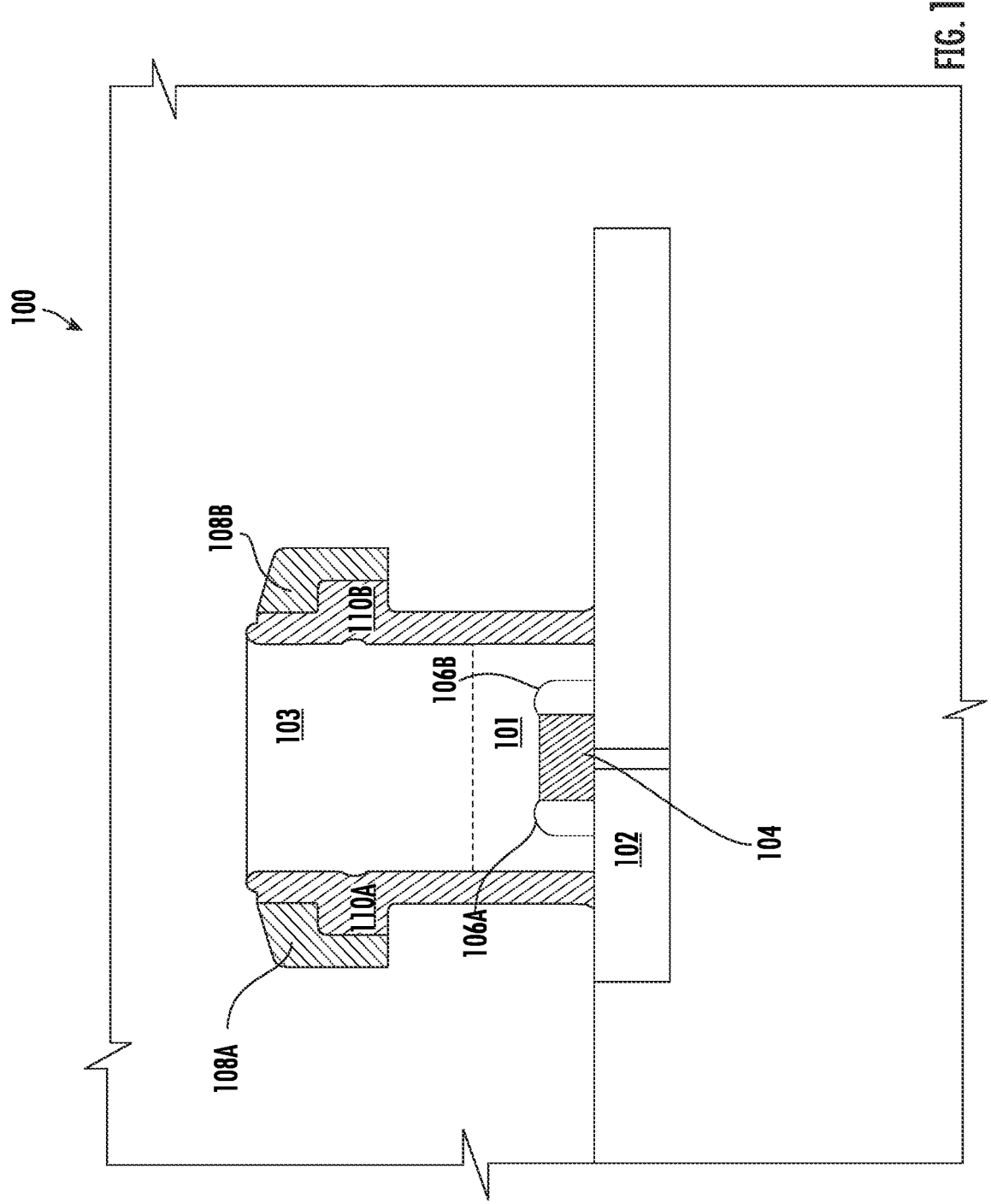
FIG. 1 illustrates a cross section view of an example sensing component in accordance with various embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

The components illustrated in the figures represent components that may or may not be present in various embodiments of the present disclosure described herein such that embodiments may include fewer or more components than those shown in the figures while not departing from the scope of the present disclosure. Some components may be omitted from one or more figures or shown in dashed line for visibility of the underlying components.

The phrases "in an example embodiment," "some embodiments," "various embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such components or features may be optionally included in some embodiments, or may be excluded.

The term "electronically coupled" or "in electronic communication with" in the present disclosure refer to two or more electrical elements and/or electric circuit(s) being connected through wired means (for example but not limited to, conductive wires or traces) and/or wireless means (for example but not limited to, wireless network, electromagnetic field), such that data and/or information (for example, electronic indications, signals) may be transmitted to and/or received from the electrical elements and/or electric circuit(s) that are electronically coupled.

The terms "gel" or "gel material" may refer to a non-fluid colloidal network or polymer or a soft, semi-solid material that exhibits no flow when in a steady state. In some embodiments, an example gel may comprise a partially liquid material. Additionally, a gel may exhibit adhesive and/or tack properties. The term gelation may refer to an example process for forming and/or setting a gel. In some embodiments, a gel may be treated or cured in order to attain target properties.

Sensing components (e.g., pressure/micro-pressure sensing components and/or force sensing components) are critical for a wide range of existing and emerging applications such as smart medical devices and real-time healthcare monitoring. Apparatuses and systems incorporating such sensing components include, for example, without limitation motor control apparatuses, HVAC systems, hydraulic control systems, blood diffusion apparatuses, compressors, robotics, automotive systems, control systems and the like. In some examples, such apparatuses may be configured to detect a pressure associated with a media (e.g., a substance, wet media, fluid and/or the like). For instance, an example pressure sensing component may comprise a pressure sensing element (e.g., sense die) and a pressure measuring element. The pressure sensing element may be configured to absorb a pressure of a media which in turn is detected and/or sensed by the pressure measuring element. The pressure measuring element may be configured to convert an incoming pressure of the media (e.g., mechanical stress caused by the incoming pressure of the media) into a measurable electrical signal. In some applications, the pressure sensing element (e.g., sense die) may be coupled to a coupling element (e.g., a gel) that absorbs and safely transfers a force to the pressure sensing element thus providing a protective layer.

While gel coupled pressure sensing elements may help isolate and protect the pressure sensing element, they plagued by challenges in measurement performance and reliability due to a variety of different factors. For example, the internal stress of a gel material may cause an offset shift during a curing phase of manufacturing which may result in inaccurate readings generated by apparatuses incorporating such sensing components. In some examples, an offset shift caused by a coupling element (e.g., gel material) may necessitate trimming an output of a sensing component associated therewith adding unnecessary complexity and cost. Additionally, properties of the coupling element (e.g., hardness or tack) can detrimentally affect the performance and sensitivity of the sensing element. For example, a lack of uniformity of the coupling element (e.g., gel material) may generate measurement errors.

In accordance with various embodiments of the present disclosure, example methods, components, apparatuses, and systems are provided.

In various embodiments, the present disclosure may provide a sensing component comprising a substrate, a sensing element attached to a surface of the substrate and in electronic communication therewith, a lower coupling element in contact with the sensing element defining a bottom layer of the sensing component, and an upper coupling element disposed adjacent a top surface of the lower coupling element and defining a top layer of the sensing component, wherein the lower coupling element exhibits lower internal stress relative to the upper coupling element. In some examples, each of the lower coupling element and the upper coupling element comprises a gel material. In some examples, the lower coupling element comprises a liquid or oil. In some examples, the sensing component comprises a pressure sensing component, the sensing element comprises a sense die and the substrate comprises a PCBA or ceramic board. In some examples, a ratio a volume of the lower coupling element to a volume of the upper coupling element is 1:3. In some examples, at least one of the lower coupling element and the upper coupling element comprises a silicone gel or a silicone oil. In some examples, the lower coupling element comprises an inhibitor substance. In some examples, the upper coupling element comprises a catalyst substance. In some examples, the lower coupling element and the upper coupling element are disposed within a columnar structure. In some examples, a height of the lower coupling element within the columnar structure is approximately 0.6 microns, and a height of the upper coupling element within the columnar structure is approximately 1 mm.

In various embodiments, the present disclosure may provide a method for manufacturing a sensing component. In some examples, the method comprises preparing a substrate, attaching a sensing element to a surface of the substrate, attaching a columnar structure to the substrate in order to surround the sensing element and define a cavity, disposing a lower coupling element within the columnar structure, and disposing an upper coupling element within the structure, wherein the lower coupling element exhibits lower internal stress relative to the upper coupling element. In some examples, the method further comprises subsequent to disposing the lower coupling element within the columnar structure, setting or curing the sensing component for a first time period. In some examples, the method further comprises subsequent to disposing the lower coupling element within the columnar structure, curing the sensing component for a second time period. In some examples, each of the lower coupling element and the upper coupling element comprises a gel material. In some examples, the lower coupling element comprises a liquid or oil. In some examples, the sensing component comprises a pressure sensing component, the sensing element comprises a sense die and the substrate comprises a PCBA or ceramic board. In some examples, a ratio a volume of the lower coupling element to a volume of the upper coupling element is 1:3. In some examples, the lower coupling element comprises an inhibitor substance. In some examples, the upper coupling element comprises a catalyst substance. In some examples, a height of the lower coupling element within the columnar structure is approximately 0.6 microns, and a height of the upper coupling element within the columnar structure is approximately 1 mm.

Referring now to FIG. 1, a cross-section view of at least a portion of an example pressure sensing component 100 in accordance with various embodiments of the present disclosure is depicted. The example pressure sensing component 100 may be a component of an apparatus or device. As depicted in FIG. 1, the example pressure sensing component 100 comprises a substrate 102 (e.g., pressure measuring element), a pressure sensing element 104, a columnar structure 110A and 110B, a lower coupling element 101 and an upper coupling element 103. As depicted, the example pressure sensing component 100 may be at least partially disposed within a housing which may comprise metal, plastic, combinations thereof, or the like.

The example pressure sensing component 100 may be configured to detect a pressure between 0 and 150,000 psi. As depicted, the example pressure sensing component 100 defines a circular body/structure. However, the pressure sensing component 100 may comprise any other shape and may be embodied in a variety of forms. In various embodiments, at least a surface of the may be fixedly attached or coupled to one or more other elements of the pressure sensing component 100. In some examples, as shown, the pressure sensing element 104 is at least partially disposed on a substrate 102 defining a bottom surface of the pressure sensing component 100.

In some embodiments, as depicted, the pressure sensing component 100 comprises a pressure sensing element 104 that is configured to detect a pressure of a media and a substrate 102 (e.g., pressure measuring element) configured to provide a measurable electrical signal in response to the media pressure absorbed by the pressure sensing element 104. In some embodiments, the pressure sensing element 104 may be or comprise a sense die, silicon die, piezoelectric chip, and/or the like. As depicted, the pressure sensing element 102 comprises a sense die. The example pressure sensing element 104 (e.g., sense die) may have a thickness between about 300 microns and about 800 microns and a surface area between about 10,000 microns$^2$ and about 4,000,000 microns$^2$. In some examples, pressure sensing element 104 (e.g., sense die) may have a thickness dimension between about 380 microns and about 410 microns and a surface area between about 300,000 microns$^2$ and about 500,000 microns$^2$. In one example, the sense die may have a thickness dimension of about 390 microns and a surface area of about 390,625 microns$^2$ (e.g., when the pressure sense die is rectangular or square, the sense die may have edges of about 625 microns in length).

As noted above, the example pressure sensing component 100 comprises a substrate 102. In various embodiments, the substrate 102 may be or comprise a pressure measuring element that is configured to provide a measurable electrical signal in response to a media pressure detected and/or absorbed by the pressure sensing element 104. As depicted, the substrate 102 comprises a printed circuit board assembly (PCBA). In various embodiments, the PCBA may be in electronic communication with the pressure sensing element 104 such that they can exchange data/information with one another. As depicted in FIG. 1, a bottom surface of the pressure sensing element 104 is fixedly attached or mounted on a surface of the substrate 102. The pressure sensing element 104 may be electrically connected to the substrate 102 (e.g., PCBA) using various techniques. In some examples, as depicted, wire bonds 106A and 106B can be utilized to electrically connect the pressure sensing element 104 to the substrate 102 (e.g., PCBA). Additionally or alternatively, the pressure sensing element 104 may be electrically connected to the substrate 102 (e.g., PCBA) via bump bonds and/or in any other suitable manner.

As noted above, in some embodiments, as depicted in FIG. 1, the substrate 102 comprises a PCBA defining an lower surface of the pressure sensing component 100. The example PCBA may comprise a thick film printed ceramic board, an FR 4 laminate and/or other material. The example PCBA may comprise one or more electronic components thereon and/or pads for connecting to other electronic components of an apparatus in which the pressure sensing component 100 may be housed or with which the pressure sensing component 100 may be used. In some examples, the PCBA may include an application specific integrated circuit (ASIC) that may be attached to a surface of the PCBA, such as an ASIC electrically coupled to the PCBA via wire bonds, bump bonds, electrical terminals, and/or any other suitable electrical connections. Additionally or alternatively, the example PCBA may include one or more conductive pads for engaging circuitry and/or electronic components in communication with a processor, remote processor or the like.

Additionally and/or alternatively, the PCBA may comprise one or more processing electronics and/or compensation circuitry (e.g., which may or may not include an ASIC). Such processing electronics may be electrically connected to terminals of the pressure sensing element 104, an ASIC (if present), and/or electrical terminals to process electrical signals from the pressure sensing element 104 and/or to transfer outputs from the pressure sensing element 104 to electronic components of one or more apparatuses used in conjunction with the pressure sensing component 100. In some instances, the PCBA may include circuitry that may be configured to format one or more output signals provided by the pressure sensing element 104 into a particular output format. For example, circuitry of the PCBA may be configured to format the output signal provided by pressure sensing element 104 into a ratio-metric output format, a current format, a digital output format and/or any other suitable format. In some cases, the circuitry of the PCBA may be configured to regulate an output voltage. Circuitry on the PCBA for providing a ratio-metric (or other) output may include traces and/or other circuitry that may serve as a conduit to test pads, and/or for providing the ratio-metric (or other) output to one or more electrical terminals facilitating electrical connections with electronic components of one or more apparatuses used in conjunction with the pressure sensing component 100.

In some examples, the PCBA may comprise a Wheatstone bridge circuit. For example, the Wheatstone bridge circuit may supply a small amount of current to the pressure sensing element 104. In response to an amount of media pressure applied, the resistivity of a plurality of strain gauges of the example pressure sensing element 104 may change in proportion to the pressure applied such that less current passes through the pressure sensing element 104. Accordingly, a measurable detected electric current may be utilized to generate a measurable output or pressure signal. In various examples, a media may make contact with an outer surface (e.g., a top surface) of the pressure sensing component 100. The pressure sensing component 100 may absorb a pressure of the media and transfer the incoming pressure to the upper coupling element 103 and the lower coupling element 101 where it can be detected and/or sensed by the pressure sensing element 104 (e.g., sense die). Subsequently, the substrate 102/pressure measuring element may convert the detected and/or sensed pressure into a measurable electrical signal.

As noted above, and as depicted in FIG. 1, the pressure sensing component 100 comprises a lower coupling element 101 and an upper coupling element 103. In some embodiments, as illustrated, the lower coupling element 101 is disposed on (e.g., surrounds, encompasses or the like) the pressure sensing element 104. As further depicted, the upper coupling element 103 is disposed a top surface of the lower coupling element 101. In some examples, as shown, the lower coupling element 101 defines a distinct and/or separate layer from the upper coupling element 103. In some embodiments, the lower coupling element 101 and the upper coupling element 103 may each comprise a gel material. In some examples, the lower coupling element 101 and the upper coupling element 103 may comprise similar materials or the same type of gel (e.g., a first gel with a first consistency and a second gel with a second consistency).

As depicted in FIG. 1, the pressure sensing component 100 comprises a lower coupling element 101. In some embodiments, as shown, the lower coupling element 101 surrounds the pressure sensing element 104 thus providing a layer of protection. As further depicted, the lower coupling element 101 is disposed within a columnar structure 110A and 110B of the example pressure sensing component 100 and defines an intermediary layer between the substrate 102 and the upper coupling element 103. It should be understood that the columnar structure 110A and 110B may define a unitary body. In various examples, the columnar structure 110A and 110B comprises plastic, metal, glass, or the like. In some embodiments, the lower coupling element 101 may comprise a gel material characterized by minimal or no internal stress. In some examples, the lower coupling element 101 may exhibit less internal stress in comparison to the upper coupling element 103. In some examples, the lower coupling element 101 may be or comprise a viscous and/or non-compressible material. In some embodiments, the lower coupling element 101 may be or comprise an oil or liquid. In some embodiments, the lower coupling element 101 may comprise a medical grade gel or material (e.g., liquid silicone, silicone oil, medical grade silicone oil and/or the like) or adhesive material. In some embodiments, the lower coupling element 101 may comprise an inhibitor substance or colorant to slow down down the gelation process in order to provide a material that is soft relative to the upper coupling element 103.

As noted above, the pressure sensing component 100 comprises an upper coupling element 103. In some embodiments, as depicted in FIG. 1, the upper coupling element 103 is disposed adjacent/on a top surface of the lower coupling element 101 and defines a distinct/separate layer. In some embodiments, a top surface of the upper coupling element 103 may be disposed adjacent a sealing member to trap the upper coupling element 103 (and the lower coupling element 101) within the columnar structure 110A and 110B. In some examples, as depicted, the pressure sensing component 100 further comprise one or more sealing members 108A and 108B that operate to further isolate the columnar structure 110A and 110B from media exposure.

As further depicted in FIG. 1, the upper coupling element 103 is disposed within the columnar structure 110A and 110B of the example pressure sensing component 100 and defines a top layer of the pressure sensing component. In some embodiments, the upper coupling element 103 may comprise a gel material characterized by minimal or no internal stress. In some examples, the upper coupling element 103 may exhibit more internal stress in comparison to the lower coupling element 101. Accordingly, in some examples, the upper coupling element 103 may comprise a hard gel material and the lower coupling element 101 may comprise a soft gel material. In some embodiments, the upper coupling element 103 may be or comprise a viscous and/or non-compressible material. In some embodiments, the upper coupling element 103 may be or comprise an oil or liquid. In some embodiments, the upper coupling element 103 may comprise a medical grade gel or material (e.g., liquid silicone, silicone oil, medical grade silicone oil and/or the like) or adhesive material. In some embodiments, the upper coupling element 103 may comprise a catalyst substance to speed up the gelation process in order to provide a material that is hard relative to the lower coupling element 101. In some embodiments, a volume of the upper coupling element 103 may be three times greater than a volume of the the lower coupling element 101. Said differently a ratio of a volume of the upper coupling element 103 to a volume of the lower coupling element 101 may be 3:1. In some examples, a height (e.g., in the y-direction) of the lower coupling element 101 may be approximately 600 microns. In some examples, a height of the upper coupling element 103 may be approximately 1 millimeter (mm). In some examples, an overall height of both the lower coupling element 101 and the upper coupling element 103 may be 2 mm.

While FIG. 1 provides an example pressure sensing component 100, it is noted that the scope of the present disclosure is not limited to such embodiments. In various embodiments, the example pressure sensing component in accordance with the present disclosure may be in other forms. Additionally and/or alternatively, other types of sensing elements and/or components may be provided in accordance with the present disclosure. In some embodiments, an example pressure sensing component 100 may comprise more than two coupling elements (e.g., three coupling elements or four coupling elements).

Figure 2:
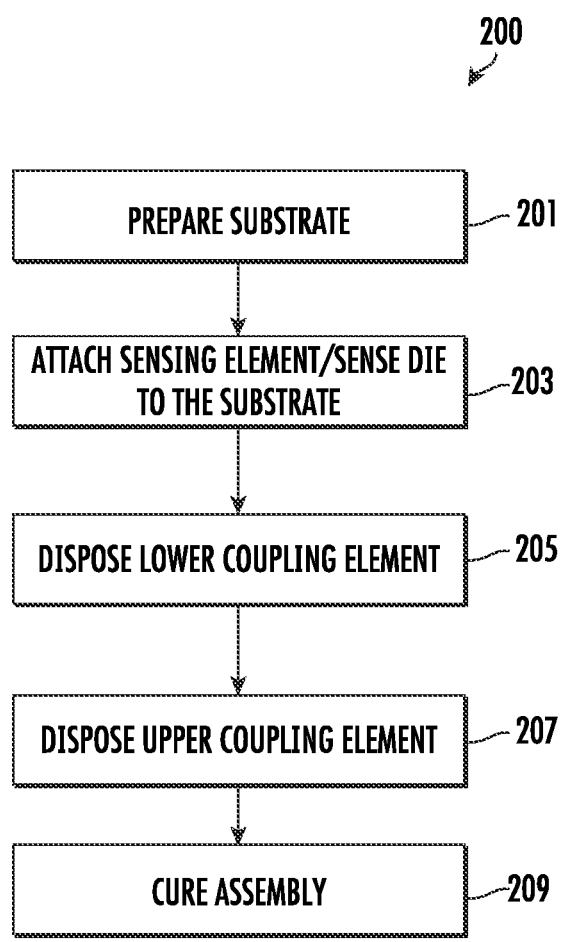
FIG. 2 illustrates an example method in accordance with various embodiments of the present disclosure.

Referring now to FIG. 2, a flowchart diagram depicting an example method 200 for producing at least an example portion of a sensing component (e.g., pressure sensing component) in accordance with various embodiments of the present disclosure is provided. The sensing component may be similar or identical to the pressure sensing component 100 discussed above in relation to FIG. 1.

Beginning at step/operation 201, the method may begin with preparing a substrate. In various embodiments, the substrate may be or comprise a PCBA, a ceramic material comprising a printed film and/or the like. The substrate may be similar or identical to the substrate 102 discussed above in relation to FIG. 1. Preparing the substrate may comprise cleaning and drying at least a portion of the substrate and preparing and/or forming electrical connections thereon.

Subsequent to step/operation 201, the method 200 proceeds to step/operation 203. At step/operation 203, subsequent to preparing the substrate, a sensing element (e.g., pressure sensing element, sense die and/or the like) is attached to at least a portion or surface of the substrate (e.g., a bottom surface of the sensing element may be attached to a top surface of the substrate). The sensing element may be similar or identical to the pressure sensing element 104 discussed above in connection with FIG. 1. In some examples, attaching the sensing element to the substrate may comprise electrically connecting the sensing element and the substrate, e.g., using wire bonds, bump bonds or the like.

Subsequent to subsequent to attaching the sensing element to at least a portion or surface of the substrate at step/operation 203, the method 200 proceeds to step/operation 205. At step/operation 205, a lower coupling element is disposed unto (e.g., applied, dispensed, injected, or the like) at least a portion of the sensing element. The lower coupling element may be similar or identical to the lower coupling element 101 discussed above in relation to FIG. 1. In some examples, the lower coupling element completely covers the sensing element. In some embodiments, step/operation 203 further comprises attaching or securing a structure/receiving member to the substrate (e.g., a ring, member, column, columnar structure, and/or the like) such that the structure surrounds the sensing element and provides a cavity for receiving the lower coupling element. In some embodiments, the lower coupling element may be at least partially set or cured prior to proceeding with further steps/operation. In some examples, the lower coupling element may be set or cured for a time between 0 hours and 10 hours. In some embodiments, as noted elsewhere herein, the lower coupling element may comprise an inhibitor substance that slows down a gelation and/or curing process.

Subsequent to step/operation 205, the method 200 proceeds to step/operation 207. At step/operation 207, subsequent to disposing the lower coupling element, an upper coupling element is disposed thereon. In some examples, a seal and/or sealing member may be disposed on a top surface of the upper coupling element. As noted above, the upper coupling element may comprise a catalyst substance to speed up a gelation and/or curing process.

Subsequent to step/operation 207, the method 200 proceeds to step/operation 209. At step/operation 209, subsequent to disposing the upper coupling element, at least a portion of the assembly/sensing component is cured. In some examples, curing the assembly comprises implementing a thermal curing technique. In some examples, the assembly may be cured a time between 2 hours and 24 hours.

Although FIG. 2 illustrates one example of a method 200 for producing a sensing component, other methods may be utilized. For example, while shown as a series of operations/steps, various operations/steps in FIG. 3 could overlap, occur in parallel, occur in a different order, or occur multiple times.

Figure 3:
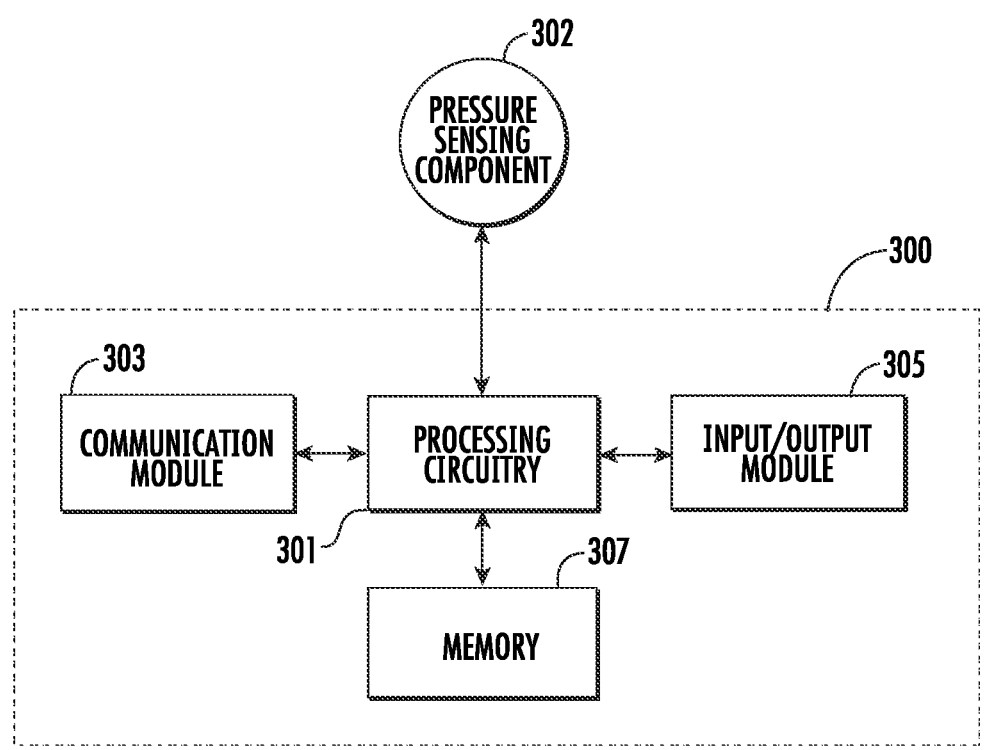
FIG. 3 illustrates an example controller component in accordance with various embodiments of the present disclosure.

Referring now to FIG. 3, a schematic diagram depicting an example controller component 300 of an example apparatus in electronic communication with a pressure sensing component 302 in accordance with various embodiments of the present disclosure is provided. The example apparatus may be or comprise, for example, without limitation, a motor control apparatuses, hydraulic control apparatus, blood diffusion apparatus, control system apparatus and the like. As shown, the controller component 300 comprises processing circuitry 301, a communication module 303, input/output module 305, a memory 307 and/or other components configured to perform various operations, procedures, functions or the like described herein.

As shown, the controller component 300 (such as the processing circuitry 301, communication module 303, input/output module 305 and memory 307) is electrically coupled to and/or in electronic communication with a pressure sensing component 302 such that it can exchange (e.g., transmit and receive) data with the processing circuitry 301 of the controller component 300. In some embodiments, the pressure sensing component 302 may be coupled to the controller component 300. In other embodiments, the pressure sensing component 302 may be remote from the controller component 300.

The processing circuitry 301 may be implemented as, for example, various devices comprising one or a plurality of microprocessors with accompanying digital signal processors; one or a plurality of processors without accompanying digital signal processors; one or a plurality of coprocessors; one or a plurality of multi-core processors; one or a plurality of controllers; processing circuits; one or a plurality of computers; and various other processing elements (including integrated circuits, such as ASICs or FPGAs, or a certain combination thereof). In some embodiments, the processing circuitry 301 may comprise one or more processors. In one exemplary embodiment, the processing circuitry 301 is configured to execute instructions stored in the memory 307 or otherwise accessible by the processing circuitry 301. When executed by the processing circuitry 301, these instructions may enable the controller component 300 to execute one or a plurality of the functions as described herein. No matter whether it is configured by hardware, firmware/software methods, or a combination thereof, the processing circuitry 301 may comprise entities capable of executing operations according to the embodiments of the present invention when correspondingly configured. Therefore, for example, when the processing circuitry 301 is implemented as an ASIC, an FPGA, or the like, the processing circuitry 301 may comprise specially configured hardware for implementing one or a plurality of operations described herein. Alternatively, as another example, when the processing circuitry 301 is implemented as an actuator of instructions (such as those that may be stored in the memory 307), the instructions may specifically configure the processing circuitry 301 to execute one or a plurality of algorithms and operations.

The memory 307 may comprise, for example, a volatile memory, a non-volatile memory, or a certain combination thereof. Although illustrated as a single memory in FIG. 3, the memory 307 may comprise a plurality of memory components. In various embodiments, the memory 307 may comprise, for example, a hard disk drive, a random access memory, a cache memory, a flash memory, a Compact Disc Read-Only Memory (CD-ROM), a Digital Versatile Disk Read-Only Memory (DVD-ROM), an optical disk, a circuit configured to store information, or a certain combination thereof. The memory 307 may be configured to store information, data, application programs, instructions, and etc., so that the controller component 300 can execute various functions according to the embodiments of the present disclosure. For example, in at least some embodiments, the memory 307 is configured to cache input data for processing by the processing circuitry 301. Additionally or alternatively, in at least some embodiments, the memory 307 is configured to store program instructions for execution by the processing circuitry 301. The memory 307 may store information in the form of static and/or dynamic information. When the functions are executed, the stored information may be stored and/or used by the controller component 300.

The communication module 303 may be implemented as any apparatus included in a circuit, hardware, a computer program product or a combination thereof, which is configured to receive and/or transmit data from/to another component or apparatus. The computer program product comprises computer-readable program instructions stored on a computer-readable medium (for example, the memory 307) and executed by a controller component 300 (for example, the processing circuitry 301). In some embodiments, the communication module 303 (as with other components discussed herein) may be at least partially implemented as the processing circuitry 301 or otherwise controlled by the processing circuitry 301. In this regard, the communication module 303 may communicate with the processing circuitry 301, for example, through a bus. The communication module 303 may comprise, for example, antennas, transmitters, receivers, transceivers, network interface cards and/or supporting hardware and/or firmware/software, and is used for establishing communication with another apparatus. The communication module 303 may be configured to receive and/or transmit any data that may be stored by the memory 307 by using any protocol that can be used for communication between apparatuses. The communication module 303 may additionally or alternatively communicate with the memory 307, the input/output module 305 and/or any other component of the controller component 300, for example, through a bus.

In some embodiments, the controller component 300 may comprise an input/output module 305. The input/output module 305 may communicate with the processing circuitry 301 to receive instructions input by a user and/or to provide audible, visual, mechanical or other outputs to the user. Therefore, the input/output module 305 may comprise supporting devices, such as a keyboard, a mouse, a display, a touch screen display, and/or other input/output mechanisms. Alternatively, at least some aspects of the input/output module 305 may be implemented on a device used by the user to communicate with the controller component 300. The input/output module 305 may communicate with the memory 307, the communication module 303 and/or any other component, for example, through a bus. One or a plurality of input/output modules and/or other components may be included in the controller component 300.

For example, the pressure sensing component 302 may be similar to pressure sensing component 100 described above with regard to FIG. 1. For example, pressure sensing component 302 may convert a pressure of a media absorbed by the pressure sensing component 302 into a measurable electrical signal.

Figure 4:
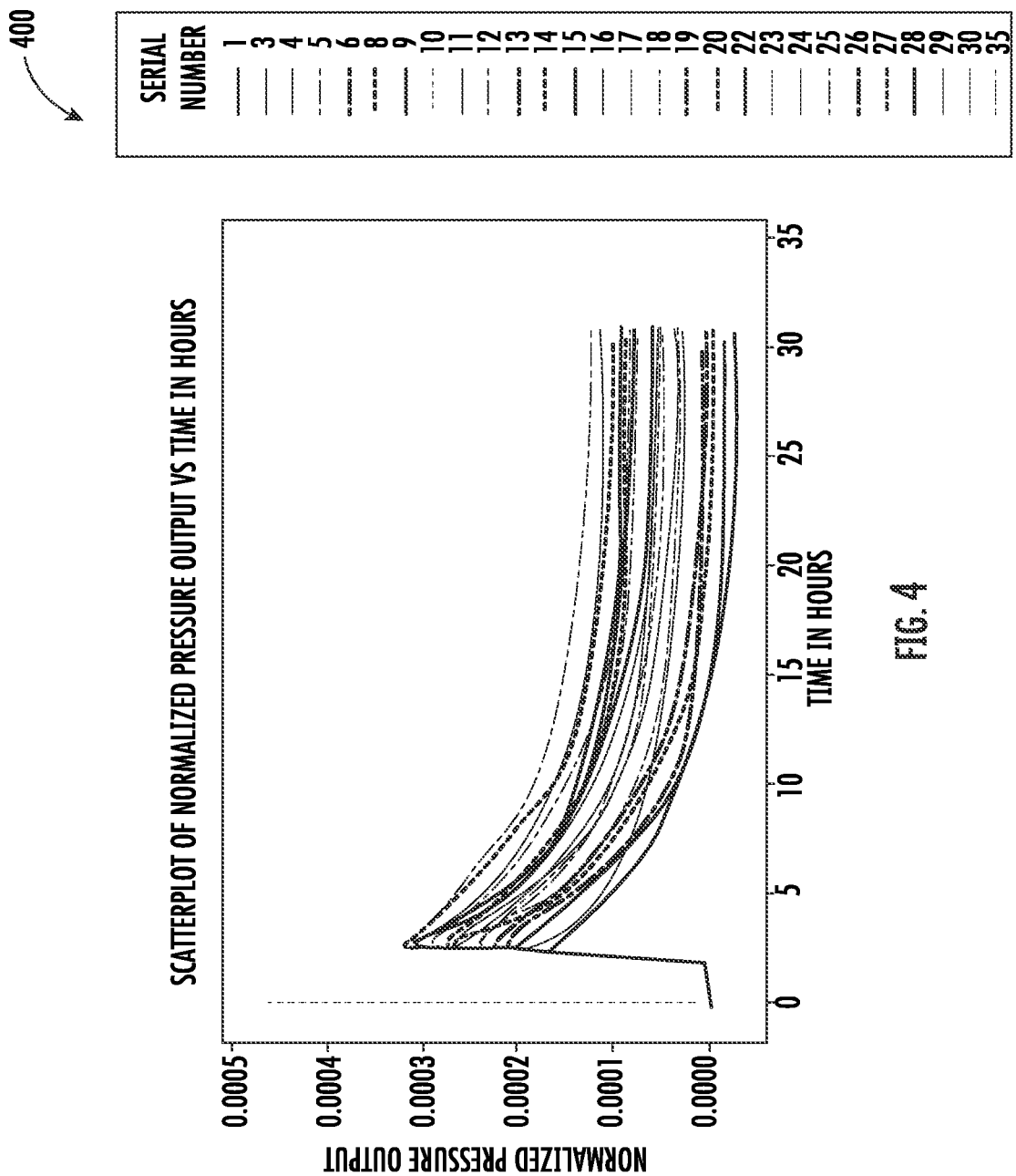
FIG. 4 illustrates a graph depicting example measurements.

Referring now to FIG. 4 an example graph 400 depicting example measurements by conventional sensing electrodes is provided.

As depicted in FIG. 4, the x-axis represents a plurality of instances in time. As depicted, the y-axis represents a detected voltage signal measured in volts (V) corresponding with a normalized pressure output by conventional sensing components. As illustrated in FIG. 4, the offset values generated by the conventional sensing components are relatively high (as depicted, up to 0.0003 V along the y-axis). Thus it should be understood that the conventional sensing components may generate inaccurate measurements due to high offset values and/or shifts.

Figure 5:
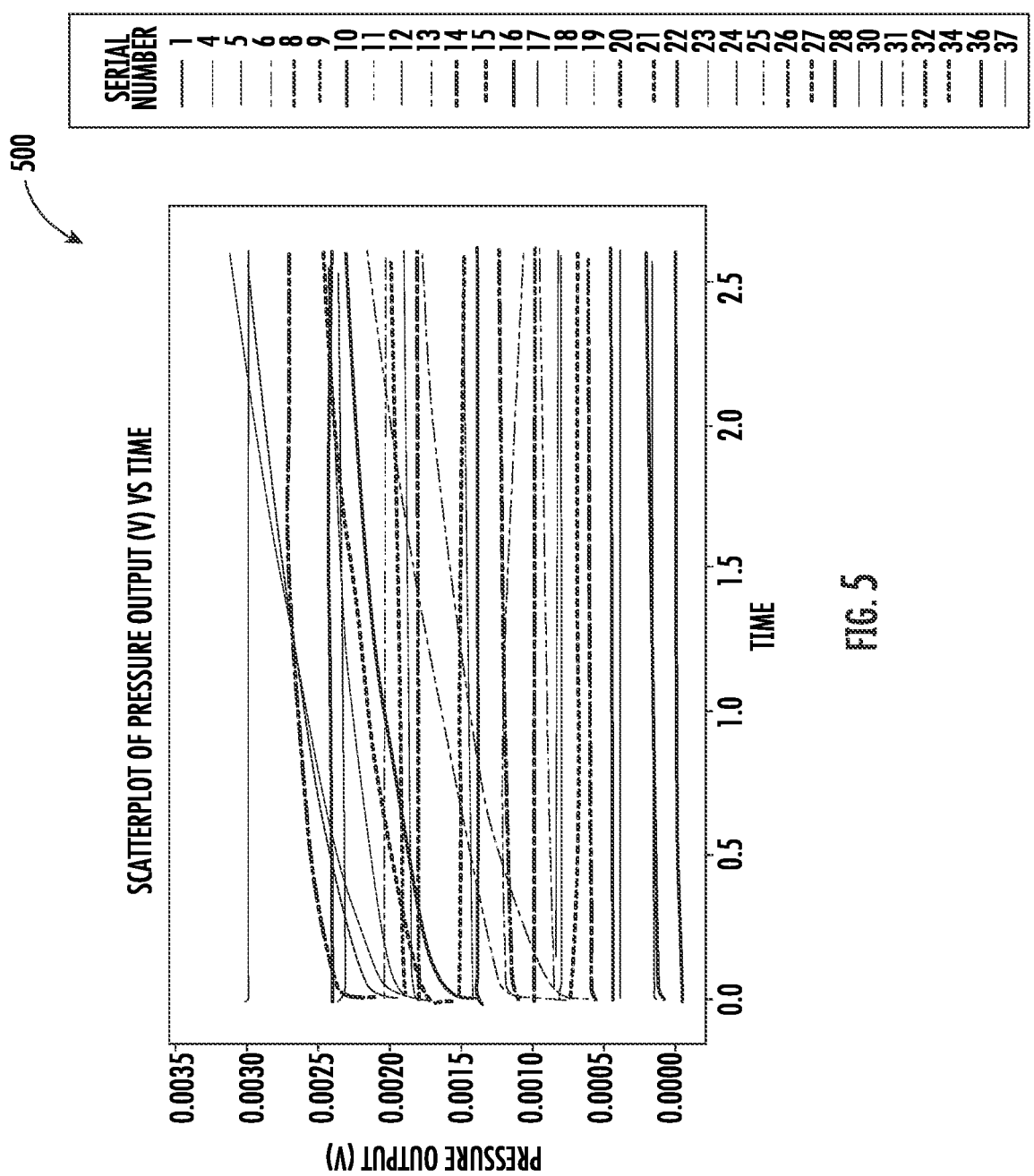
FIG. 5 illustrates a graph depicting example measurements associated with an example sensing component in accordance with various embodiments of the present disclosure.

Referring now to FIG. 5 an example graph 500 depicting example measurements by sensing components in accordance with certain embodiments of the present disclosure is provided.

As depicted in FIG. 5, the x-axis represents a plurality of instances in time. As depicted, the y-axis represents a detected voltage signal measured in volts (V) corresponding with a normalized pressure output by sensing components. As illustrated in FIG. 5, the offset values generated by the sensing components are significantly lower relative to the offset values generated by the conventional sensing components depicted in FIG. 4 (as depicted, typically close to 0 V along the y-axis in a plurality of examples). Accordingly, FIG. 5 demonstrates that sensing components incorporating a plurality of coupling elements will lower the offset stress and provide a more robust component with improved performance. Additionally, lowering the offset associated with a sensing component provides a more sensitive force range. Additionally, in some examples, a viscous (e.g., liquid, oil or the like) lower coupling element may provide a uniform layer adjacent the sensing element and improve performance and stability.

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the disclosure are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A sensing component comprising:
    a substrate;
    a sensing element attached to a surface of the substrate and in electronic communication therewith;
    a lower coupling element in contact with the sensing element defining a bottom layer of the sensing component, wherein the lower coupling element comprises an inhibitor substance; and
    an upper coupling element disposed adjacent a top surface of the lower coupling element and defining a top layer of the sensing component, wherein the lower coupling element exhibits lower internal stress relative to the upper coupling element, wherein the upper coupling element comprises a gel material.

2. The sensing component of claim 1, wherein the lower coupling element comprises a gel material.

3. The sensing component of claim 2, wherein the upper coupling element comprises a catalyst substance.

4. The sensing component of claim 1, wherein:
    the sensing component comprises a pressure sensing component, the sensing element comprises a sense die and the substrate comprises a PCBA or ceramic board.

5. The sensing component of claim 1, wherein a ratio of a volume of the lower coupling element to a volume of the upper coupling element is 1:3.

6. The sensing component of claim 1, wherein at least one of the lower coupling element and the upper coupling element comprises a silicone gel.

7. The sensing component of claim 1, wherein the lower coupling element and the upper coupling element are disposed within a columnar structure.

8. The sensing component of claim 7, wherein a height of the lower coupling element within the columnar structure is approximately 0.6 microns, and a height of the upper coupling element within the columnar structure is approximately 1 millimeter.

9. A method for manufacturing a sensing component, the method comprising:
    preparing a substrate;
    attaching a sensing element to a surface of the substrate;
    attaching a columnar structure to the substrate in order to surround the sensing element and define a cavity;
    disposing a lower coupling element within the columnar structure, wherein the lower coupling element comprises an inhibitor substance; and
    disposing an upper coupling element within the columnar structure, wherein the lower coupling element exhibits lower internal stress relative to the upper coupling element, wherein the upper coupling element comprises a gel material.

10. The method of claim 9, further comprising:
    subsequent to disposing the lower coupling element within the columnar structure, setting or curing the sensing component for a first time period.

11. The method of claim 9, further comprising:
    subsequent to disposing the lower coupling element within the columnar structure, curing the sensing component for a second time period.

12. The method of claim 9, wherein the lower coupling element comprises a gel material.

13. The method of claim 9, wherein:
    the sensing component comprises a pressure sensing component, the sensing element comprises a sense die and the substrate comprises a PCBA or ceramic board.

14. The method of claim 9, wherein a ratio of a volume of the lower coupling element to a volume of the upper coupling element is 1:3.

15. The method of claim 9, wherein the upper coupling element comprises a catalyst substance.

16. The method of claim 9, wherein a height of the lower coupling element within the columnar structure is approximately 0.6 microns, and a height of the upper coupling element within the columnar structure is approximately 1 millimeter.

\* \* \* \* \*